United States Patent
Ellath Meethal et al.

(10) Patent No.: US 12,348,543 B2
(45) Date of Patent: Jul. 1, 2025

(54) METHOD AND SYSTEM FOR DETECTING A CYBER-ATTACK ON A MACHINE CONTROLLER

(71) Applicant: Siemens Aktiengesellschaft, Munich (DE)

(72) Inventors: Rishith Ellath Meethal, Bavaria (DE); Christoph Ernst Ludwig, Munich (DE); Mohamed Khalil, Munich (DE); Christoph Heinrich, Donauwörth (DE); Steffen Fries, Baldham (DE); Uwe Blöcher, Puchheim (DE); Dirk Hartmann, Aßling (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 289 days.

(21) Appl. No.: 18/028,599

(22) PCT Filed: Sep. 10, 2021

(86) PCT No.: PCT/EP2021/074905
§ 371 (c)(1),
(2) Date: Mar. 27, 2023

(87) PCT Pub. No.: WO2022/069188
PCT Pub. Date: Apr. 7, 2022

(65) Prior Publication Data
US 2024/0031388 A1 Jan. 25, 2024

(30) Foreign Application Priority Data
Sep. 29, 2020 (EP) .................................. 20199058

(51) Int. Cl.
*H04L 9/40* (2022.01)
*G05B 19/418* (2006.01)
(Continued)

(52) U.S. Cl.
CPC ...... *H04L 63/1425* (2013.01); *G05B 19/4183* (2013.01); *G05B 19/41885* (2013.01);
(Continued)

(58) Field of Classification Search
CPC . H04L 63/1425; H04L 63/1408; G06F 21/50; G06F 21/53; G05B 19/4183; G05B 19/41885
(Continued)

(56) References Cited

U.S. PATENT DOCUMENTS

| 7,593,837 B2* | 9/2009 | Nakaya | G05B 17/02 |
| | | | 703/6 |
| 10,261,846 B1* | 4/2019 | Patton | G06F 9/542 |

(Continued)

FOREIGN PATENT DOCUMENTS

WO    WO 2020046371 A1    3/2020

OTHER PUBLICATIONS

Adepu Sridhar et al: "Control Behavior Integrity for Distributed Cyber-Physical Systems"; 2020 ACM/IEEE 11th International Conference on Cyber-Physical Systems (ICCPS), IEEE; Apr. 21, 2020 (Apr. 21, 2020); pp. 30-40, XP033772926; DOI: 10.1109/ICCPS48487.2020.00011 [retrieved on May 18, 2020] abstract figure 2 sections III.-V.

(Continued)

*Primary Examiner* — Thanh T Le
(74) *Attorney, Agent, or Firm* — Schmeiser, Olsen & Watts LLP

(57) ABSTRACT

For detecting a cyber-attack on a machine controller, a concurrent simulation of the machine is run in a secured access domain. From the machine controller actual control data are transmitted to the machine and resulting monitoring data are transmitted to a monitoring device. Furthermore, sensor data of the machine are transmitted to the concurrent (Continued)

simulation on a first secured transmission path. Based on the sensor data, the concurrent simulation simulates an operational behavior of the machine, thus inferring simulated monitoring data. The simulated monitoring data are then compared with the resulting monitoring, and an alarm signal is triggered depending on the comparison.

12 Claims, 3 Drawing Sheets

(51) Int. Cl.
    *G06F 21/50*     (2013.01)
    *G06F 21/53*     (2013.01)
(52) U.S. Cl.
    CPC .............. *G06F 21/50* (2013.01); *G06F 21/53* (2013.01); *H04L 63/1408* (2013.01)
(58) Field of Classification Search
    USPC .......................................................... 726/23
    See application file for complete search history.

(56) References Cited

U.S. PATENT DOCUMENTS

| | | | |
|---|---|---|---|
| 2005/0096872 A1* | 5/2005 | Blevins .................. | G05B 17/02 702/183 |
| 2007/0005266 A1* | 1/2007 | Blevins .............. | G05B 19/0426 702/22 |
| 2016/0065603 A1* | 3/2016 | Dekel .................. | H04L 63/1425 726/23 |
| 2017/0264629 A1 | 9/2017 | Wei et al. | |
| 2017/0289191 A1* | 10/2017 | Thioux ............... | H04L 63/1441 |
| 2018/0159879 A1 | 6/2018 | Mestha et al. | |
| 2018/0262525 A1* | 9/2018 | Yan ........................ | G06N 20/00 |
| 2019/0176862 A1* | 6/2019 | Kumar .................. | B61L 25/025 |
| 2020/0185107 A1* | 6/2020 | Cox ........................ | G16H 50/50 |
| 2020/0233956 A1* | 7/2020 | Wang ..................... | B60L 53/305 |
| 2021/0273965 A1* | 9/2021 | Pi ............................ | G06N 20/00 |
| 2021/0287459 A1* | 9/2021 | Cella ..................... | G07C 5/0808 |
| 2021/0326731 A1* | 10/2021 | Nasle ....................... | G06F 30/27 |
| 2021/0344700 A1* | 11/2021 | Ueno ................. | H04L 12/40169 |
| 2022/0063689 A1* | 3/2022 | Kumar .................. | H04N 23/661 |
| 2022/0100185 A1* | 3/2022 | Karri .................. | G05B 23/0229 |

OTHER PUBLICATIONS

Luchs Mark et al: "Last Line of Defense: A Novel IDS Approach Against Advanced Threats in Industrial Control Systems"; Jun. 4, 2017 (Jun. 4, 2017); Advances in Biometrics : International Conference; ICB 2007, Seoul, Korea, Aug. 27-29, 2007; Proceedings; [Lecture Notes in Computer Science; Lect.Notes Computer], Springer, Berlin, Heidelberg, pp. 141-160; XP047418461; ISBN: 978-3-540-74549-5; [retrieved on Jun. 4, 2017] abstract p. 142-p. 152.

Ouchitachen Hicham et al: "Improved multi-objective weighted clustering algorithm in Wireless Sensor Network"; Egyptian Informatics Journal; Elsevier, Amsterdam, NL; vol. 18, No. 1; Aug. 12, 2016 (Aug. 12, 2016); pp. 45-54; XP029933317; ISSN: 1110-8665; DOI: 10.1016/J.EIJ.2016.06.001; p. 49.

PCT International Search Report and Written Opinion of International Searching Authority mailed Dec. 20, 2021 corresponding to PCT International Application No. PCT/EP2021/074905 filed Sep. 10, 2021.

* cited by examiner

METHOD AND SYSTEM FOR DETECTING A CYBER-ATTACK ON A MACHINE CONTROLLER

CROSS-REFERENCE TO RELATED APPLICATIONS

This application claims priority to PCT Application No. PCT/EP2021/074905, having a filing date of Sep. 10, 2021, which claims priority to EP Application No. 20199058.7, having a filing date of Sep. 29, 2020, the entire contents both of which are hereby incorporated by reference.

FIELD OF TECHNOLOGY

The following relates to a method and system for detecting a cyber-attack on a machine controller.

BACKGROUND

Complex machines like motors, power plants, production plants, turbines, combustion engines, power grids, machining tools, or vehicles often require sophisticated machine controllers to operate the machine in a productive, stable, and secure operating range. Nowadays, such machine controllers are usually driven by a complex software system, which is often coupled to the internet or allows some other external access. However, such external access may entail the risk that a machine controller may be infected by malware, and in consequence, causes malfunctions, machine damages, or personal injuries. Such a cyber-attack may modify control data to control the machine and simultaneously modify feedback data from the machine, thus obfuscating that modification.

To cope with the threat of cyber-attacks on machine controllers several measures are taken up to now. These measures comprise: Separating the machine controller from the internet or from corporate networks, monitoring network activities, protecting the machine controller from external access, incorporating redundant sensor measurements, applying intrusion detection systems, or verifying monitoring data by plausibility analyses.

SUMMARY

An aspect relates to a method and a system for detecting a cyber-attack on a machine controller, that allow for a more efficient detection of cyber-attacks and/or that allow for a better adaptation to specific machines.

For detecting a cyber-attack on a machine controller controlling a machine, a concurrent simulation of the machine is run on a computer in a secured access domain. In particular, the machine may be a motor, a power plant, a production plant, a turbine, a combustion engine, a power grid, a machining tool, a vehicle, or another technical system. From the machine controller actual control data are transmitted to the machine and resulting monitoring data are transmitted to a monitoring device. Furthermore, sensor data of the machine are transmitted to the concurrent simulation on a first secured transmission path. Based on the sensor data, the concurrent simulation simulates an operational behavior of the machine, thus inferring simulated monitoring data. The simulated monitoring data are then compared with the resulting monitoring data, and an alarm signal is triggered depending on the comparison.

For performing the inventive method, a system, a computer program product (non-transitory computer readable storage medium having instructions, which when executed by a processor, perform actions), and a non-transient computer readable storage medium are provided.

The inventive method and/or the inventive system may be implemented by one or more processors, computers, application specific integrated circuits (ASIC), digital signal processors (DSP), programmable logic controllers (PLC), and/or field-programmable gate arrays (FPGA).

Embodiments of the invention allow for an efficient and reliable detection of cyber-attacks, in particular if the actual machine control and/or monitoring does not coincide with the desired operation. In addition, the machine can be prevented in a machine specific way from getting damaged even if the machine controller is affected by a cyber-attack.

According to an embodiment of the invention, the concurrent simulation may be implemented as a digital twin continuously supplied with sensor data of the running machine and continuously simulating its operational behavior. In particular, the digital twin may run a continuously updated simulation of the machine in parallel to the running machine, thus representing their state, in real-time or even in a predictive way. Furthermore, such a digital twin often allows to determine actual physical parameters of the machine which are difficult or impossible to measure by sensors.

According to a further embodiment of the invention the resulting monitoring data may comprise sensor data, actual control data and/or operational data of the running machine, as present or available in the machine controller. The resulting monitoring data may particularly comprise data which are prone to be compromised by cyber-attacks. Such compromising can then be detected by the comparison with the simulated monitoring data.

According to a further embodiment of the invention the resulting monitoring data may be transmitted on a second secured transmission path from the machine controller and/or from the monitoring device to a comparator. The latter may also receive the simulated monitoring data for the comparison with the resulting monitoring data. The second secured transmission path for the resulting monitoring data allows to ensure that the comparator receives the original resulting monitoring data which are also used by the machine controller and which may be compromised by a cyber-attack. By the comparison with the simulated monitoring data such a cyber-attack can easily be detected.

According to an embodiment of the invention the resulting monitoring data may comprise the actual control data. Moreover, the concurrent simulation may evaluate an inverse simulation model of the machine, thus determining simulated control data which are compatible with the sensor data. The simulated control data can then be compared with the actual control data, and the alarm signal may be triggered depending on the comparison. By comparing the simulated control data with the actual control data, a modification of the latter by a cyber-attack can easily be detected. The simulated control data may be determined by finding out those control data which, when applied to the machine, would result in simulated sensor data coinciding with the actual sensor data.

According to a further embodiment of the invention the sensor data may comprise first measured data from a first sensor internal to the machine and second measured data from a second sensor coupled to the machine. The second sensor is secured against external influence. On that basis, a physical compatibility of the first measured data with the second measured data may be tested by the concurrent simulation. Depending on the test an alarm signal may be triggered. The usage of one or more second sensors coupled to the machine allows for collecting second measured data which are independent from machine internal sensors. In cases where the machine and its internal sensors may be affected by a cyber-attack one can test a reliability of the first measured data by checking their physical compatibility with the second measured data. Furthermore, the first and/or second sensor may be used to verify new monitoring components of the machine, e.g., sensors without own security support, whether they operate in an expected operating range, in particular during a cyber-attack.

In particular, the first measured data and the second measured data may be weighted by different weight factors in the concurrent simulation. In this way the first measured data may be provided with a higher weight than the second measured data because they may have a higher accuracy. In such a case a higher weight of the first measured data may improve an accuracy of the concurrent simulation. In cases where the security is more important, however, the first measured data may be provided with a lower weight than the second measured data, thus improving a reliability of the concurrent simulation.

According to a further embodiment of the invention the simulated monitoring data may be transmitted on a third secured transmission path from the concurrent simulation to a condition monitoring system. The latter may evaluate the simulated monitoring data in order to detect an anomalous behavior of the machine. Depending on the evaluation an alarm signal may triggered. In this way the machine can effectively be prevented from getting damaged.

According to further embodiments of the invention, the secured access domain and/or a secured transmission path, in particular the first, second, and/or third secured transmission path, may be secured by the following measures or entities:
- isolation or separation from the internet,
- protection against an access or data transfer from the machine controller,
- authentication of communication endpoints,
- protection of integrity or confidentiality of communicated data,
- detection of unauthorized alteration of communicated data,
- a unidirectional gateway, and/or
- a data diode.

The above measures or entities may also be used for securing the second sensor against external influence.

BRIEF DESCRIPTION

Some of the embodiments will be described in detail, with reference to the following figures, wherein like designations denote like members, wherein.

DETAILED DESCRIPTION

Figure 1:
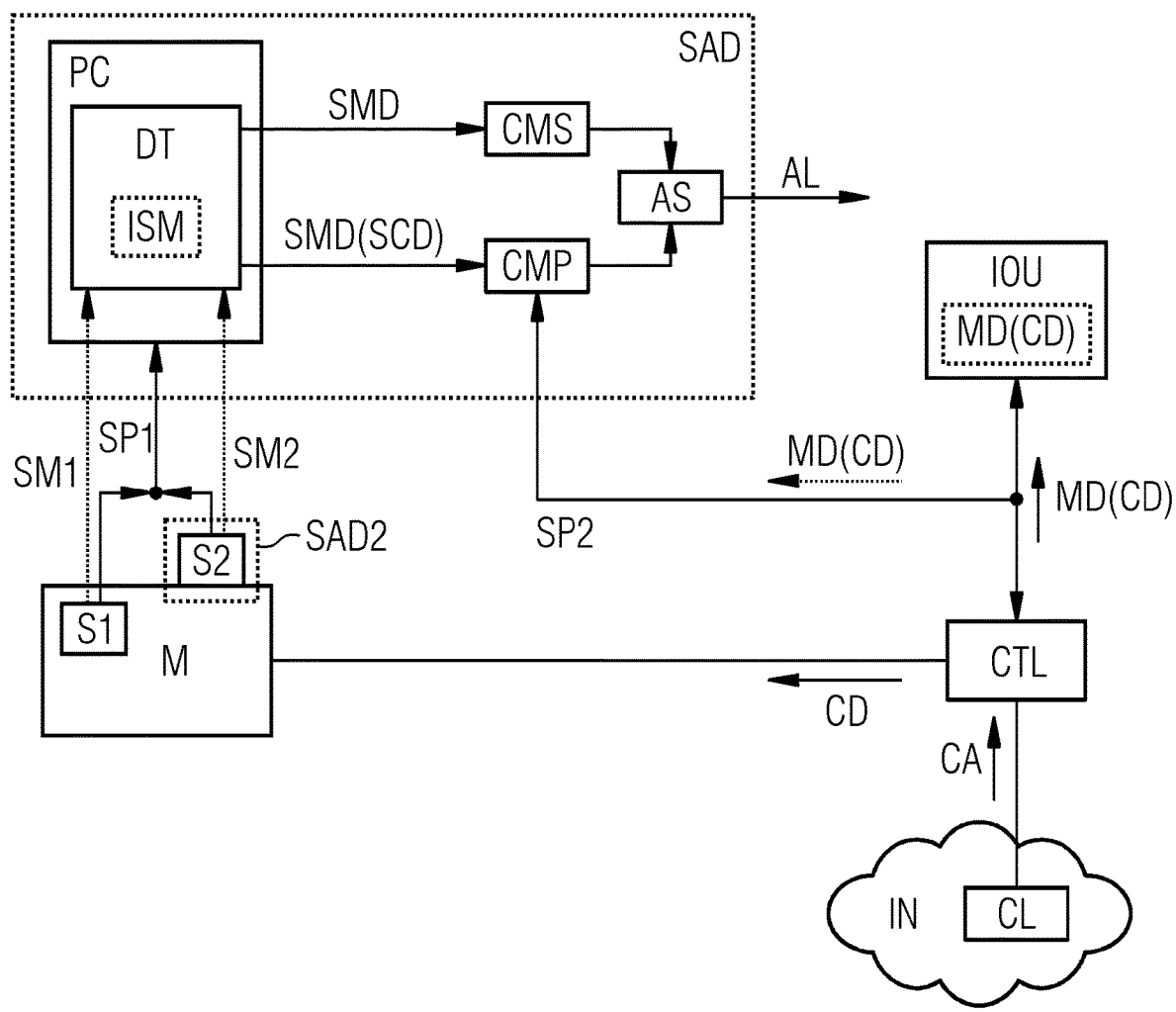
FIG. 1 shows an inventive system for detecting a cyber-attack on a machine controller.

FIG. 1 shows an inventive system for detecting a cyber-attack on a machine controller CTL in schematic representation. The machine controller CTL controls a machine M and may be implemented as a programmable logic controller, often abbreviated as PLC. The machine M may be a motor, a turbine, a power plant, a production plant, a combustion engine, a power grid, a machining tool, a vehicle, or another physical asset. In the present embodiment it is assumed that the machine M is an electric drive.

In order to control the machine M, the machine controller CTL is coupled to the machine M and transmits control data CD to it. Furthermore, the machine controller CD transmits monitoring data MD resulting from controlling the machine M by the control data CD to a monitoring device IOU. The monitoring data MD are displayed on the monitoring device IOU, which comprises an input/output unit in order to monitor the operation of the running machine M. According to the present embodiment, the monitoring data MD particularly comprise the actual control data CD. Furthermore, the monitoring data MD may comprise sensor data, e.g., about a temperature, a torque, or a pressure in the running machine M, or may comprise other operational data, e.g., about a security state, credentials, patch levels, or secure boot results.

The machine controller CTL is further coupled to a computing cloud CL via the internet IN. The cloud CL is used to process and record data for the machine controller CTL. However, the coupling to the internet IN entails the risk of cyber-attacks CA on the machine controller CTL. Such a cyber-attack CA may maliciously access the machine controller CTL and/or may infect it by malware causing malfunctions or damages of the machine M.

In particular, the control data CD actually applied to the machine M may be compromised by the cyber-attack CA so that the machine M is not controlled in the desired way. Simultaneously, the resulting monitoring data MD may be modified in such way that the monitoring device IOU does not indicate any manipulation or malfunction of the machine M.

In order to detect such a modification of the actual control data CD and/or the resulting monitoring data MD, a concurrent simulation DT of the running machine M is used according to embodiments of the invention. The concurrent simulation DT is implemented as a digital twin of the machine M, continuously supplied with sensor data of the running machine M and continuously simulating its operational behavior based on the sensor data. According to embodiments of the invention, the digital twin DT checks whether the control data CD actually applied to the machine M and/or the monitoring data MD actually displayed by the monitoring device IOU are operationally consistent with the true behavior of the machine M.

To protect the digital twin DT against cyber-attacks CA or other external influences, the digital twin DT is deployed on a computer PC in a secured access domain SAD. The secured access domain SAD is not connected to the internet IN and/or is specifically separated or isolated from it. In particular, the secured access domain SAD, and therefore the computer PC is protected against an access from the machine controller CTL and/or from the monitoring device IOU. The hardware of the computer PC is located on-premise, e.g., as an edge device or as a local workstation. The secured access domain SAD ensures the integrity of the concurrent simulation DT, provided that access to it is restricted to entitled personnel. In this case it is guaranteed that the digital twin DT simulates a true behavior of the machine M.

The digital twin DT determines or represents a state or behavior of the machine M parallel to its actual operation in real-time. In particular, the digital twin DT may provide operational data or physical data of the machine M which are not recorded or measured, which are difficult to measure, or which refer to a future state or behavior of the machine M. These operation data or physical data may be used for condition monitoring, for optimized or predictive control, and/or for maintenance of the machine M.

For measuring operational data of the machine M, a first sensor S1 and a second sensor S2 are provided. The first sensor S1 is internal to the machine M while the second sensor S2 is externally attached to the machine M. The second sensor S2 is secured against external influence by a secured access domain SAD2, which may be implemented like the secured access domain SAD described above. The secured second sensor S2 allows to verify the measurements of the first sensor S1. In this way, a compromising or damage of the first sensor S1 by malicious control data CD may be detected.

The first sensor S1 collects first measured data SM1 while the second sensor collects second measured data SM2 independently from the first sensor S1. The measured data SM1 and SM2 may particularly comprise data about a physical state or a physical property of the machine M or of a component of it. For example, data about temperatures, vibrations, applied voltages, flowing currents, emissions, fluid properties, rotating speeds, velocities, applied or exerted forces etc.

In order to feed the digital twin DT, the first measured data SM1 and the second measured data SM2 are transmitted as sensor data via a first secured transmission path SP1 to the digital twin DT. The first secured transmission path SP1 may be protected against unauthorized access or manipulation analog to the secured access domain SAD as described above. In particular, a unidirectional connection or a data diode only allowing a one-way data transfer from the sensors S1, S2 to the digital twin DT may be implemented. Furthermore, secure communication protocols, like IPSec, TLS, or DTLS may be used, communication endpoints may be authenticated, and an integrity and confidentiality of the communicated sensor data SM1, SM2 may be protected. The first secured transmission path SP1 ensures that the digital twin DT receives unaltered sensor data of the machine M for simulation.

In order to detect a manipulation of the internal first sensor S1, the digital twin DT may test a physical compatibility of the first measured data SM1 with the second measured data SM2. This may be achieved e.g., by checking whether a simulated behavior of the machine M based on the first measured data SM1 is consistent with a simulated behavior based on the second measured data SM2. If not, an alarm may be triggered.

According to the present embodiment the digital twin DT comprises an inverse simulation model ISM of the machine M. The inverse simulation model ISM uses the sensor data SM1, SM2 as input and tries to determine by simulation those control data SCD which, when applied to the machine M, would result in simulated sensor data as similar as possible to the actual measured sensor data SM1, SM2.

Furthermore, all other of the monitoring data MD are also simulated by the digital twin DT based on the sensor data SM1 and SM2. The simulated values of the monitoring data MD are provided as simulated monitoring data SMD, which include the simulated control data SCD.

The simulated monitoring data SMD are transmitted from the digital twin DT to a comparator CMP, which is also located in the secured access domain SAD.

The comparator CMP also receives the monitoring data MD via a second secured transmission path SP2 from the monitoring device IOU or from the machine controller CTL. The second secured transmission path SP2 may be secured in the same or an analog way as the first secured transmission path SP1. The second secured transmission path SP2 ensures that the comparator CMP receives the same, possibly manipulated monitoring data MD as the IOU.

The comparator CMP compares the monitoring data MD with the simulated monitoring data SMD. In particular, the comparator compares the actual control data CD with the simulated control data SCD. The comparison may comprise quantifying a deviation of the monitoring data MD from the simulated monitoring data SMD. Such a deviation can be regarded as a measure for a physical consistency of the monitoring data MD displayed to a user with the actual sensor data SM1, SM2 of the running machine M. Here, the physical consistency is determined by the digital twin DT.

If the deviation exceeds a given threshold, the comparator CMP causes an alarm system AS located in the secured access domain SAD to output an alarm signal AL. The alarm signal AL indicates that the machine controller CTL, the monitoring device IOU, or the machine M may be exposed to a cyber-attack.

In this way, cyber-attacks can be reliably detected even in cases where control data as well as monitoring data are simultaneously manipulated.

The simulated monitoring data SMD can be additionally used for a condition monitoring of the machine M. For this purpose, the simulated monitoring data SMD are additionally transmitted from the digital twin DT to a condition monitoring system CMS. The condition monitoring system CMS evaluates the simulated monitoring data SMD in order to detect an anomalous operational behavior of the machine M. If such an anomalous operational behavior is detected, the condition monitoring system CMS causes the alarm system AS to output an alarm signal AL. In this case the alarm signal AL indicates an anomalous behavior which may be a result of a cyber-attack or may result in an unsafe operation.

The condition monitoring system CMS is located in the secured access domain SAD. If not, the simulated monitoring data SMD should be transferred via a third secured transmission path to the condition monitoring system CMS. The third secured transmission path may be secured in the same or an analogous way as the first secured transmission path SP1. In this way it can be ensured that the monitoring data, here SMD, evaluated by the condition monitoring system CMS are not manipulated and reflect a true behavior of the machine M.

Figure 2:
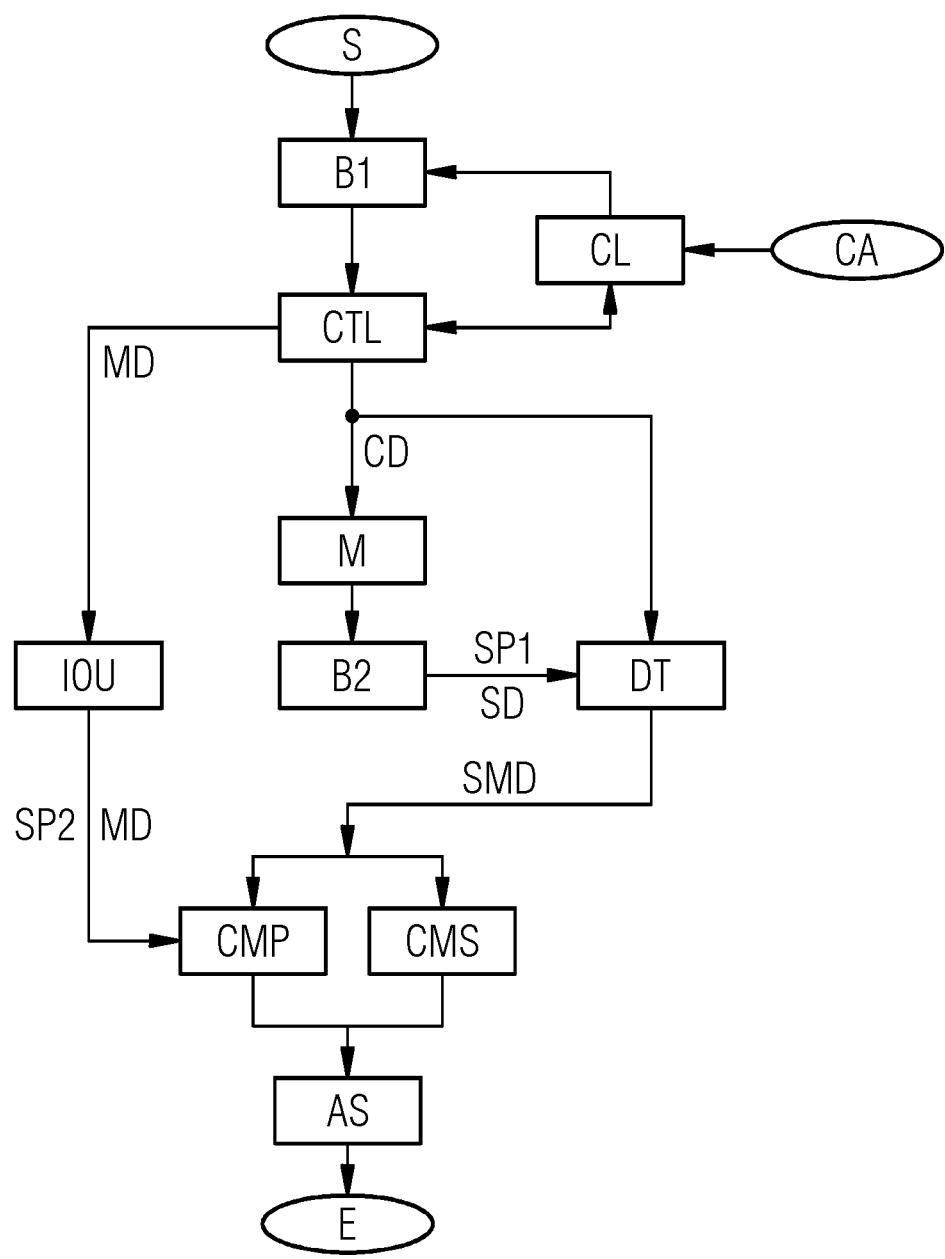
FIG. 2 shows a flow chart visualizing an inventive method for detecting a cyber-attack on a machine controller.

FIG. 2 shows a flow chart visualizing an inventive method for detecting a cyber-attack on a machine controller CTL. The method logically starts at point S and logically ends at point E.

It is assumed that the machine controller CTL interacts with a computing cloud CL which is affected by a cyber-attack CA. Because of the cyber-attack CA, control data CD for controlling the machine M and monitoring data MD for monitoring the machine M by the monitoring device IOU are maliciously manipulated in box B1. Consequently, the machine controller CTL sends the manipulated control data CD to the machine M and the manipulated monitoring data MD to the monitoring device IOU.

The machine M then operates according to the manipulated control data CD. In box B2, the response of the machine M to the manipulated control data CD is measured by sensors of the machine M, and measured sensor data SD are transmitted to a concurrent simulation DT of the machine M via a first secured transmission path SP1. The latter ensures that the concurrent simulation DT receives the unmanipulated sensor data SD. As mentioned above, the concurrent simulation DT is implemented as a digital twin of the machine M.

Moreover, the machine controller CTL transmits the manipulated control data CD to the concurrent simulation DT. The latter then operates on the manipulated control data CD and the true sensor data SD. From this, the concurrent simulation DT may recognize a physical inconsistency of the manipulated control data CD with the sensor data SD and may trigger an alarm signal.

Furthermore, the concurrent simulation DT determines simulated monitoring data SMD based on the sensor data SD as described above. The simulated monitoring data SMD are then transmitted from the concurrent simulation DT to a comparator CMP and to a condition monitoring system CMS.

The comparator CMP also receives the manipulated monitoring data MD from the monitoring device IOU via a second secured transmission path SP2. The comparator CMP then compares the manipulated monitoring data MD with the simulated monitoring data SMD as described above and triggers an alarm system AS to output an alarm signal depending on the comparison result.

The condition monitoring system CMS, on the other hand, evaluates the simulated monitoring data SMD and triggers an alarm signal if an anomalous operational behavior of the machine M is detected.

Figure 3:
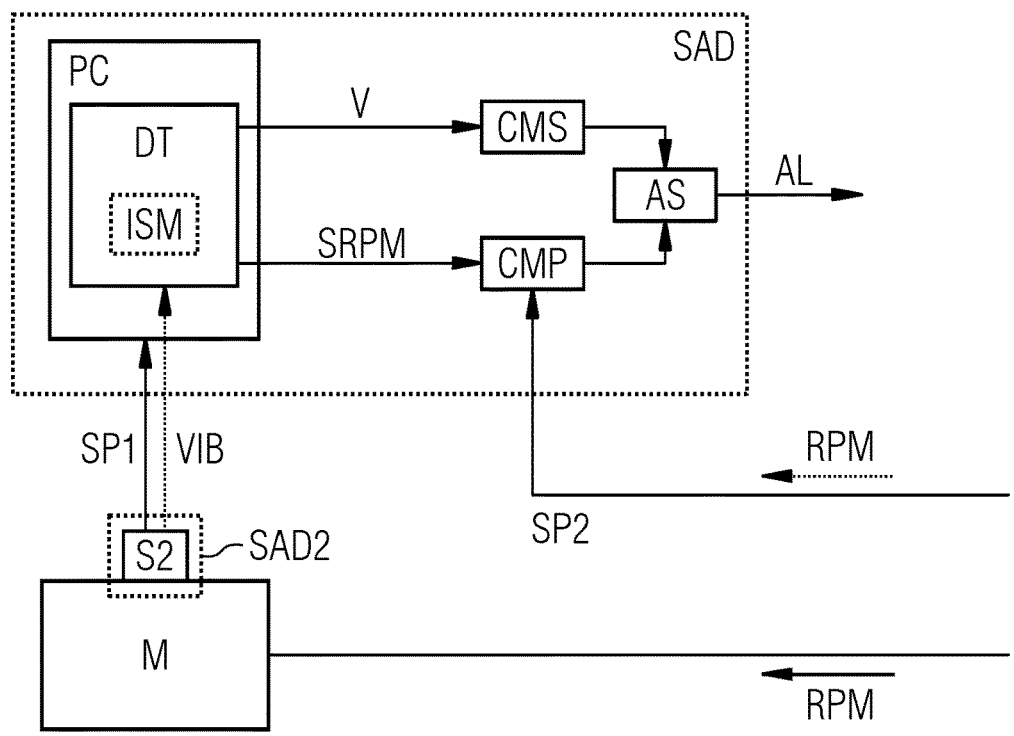
FIG. 3 shows a first specific embodiment of the invention evaluating machine vibrations.
Figure 4:
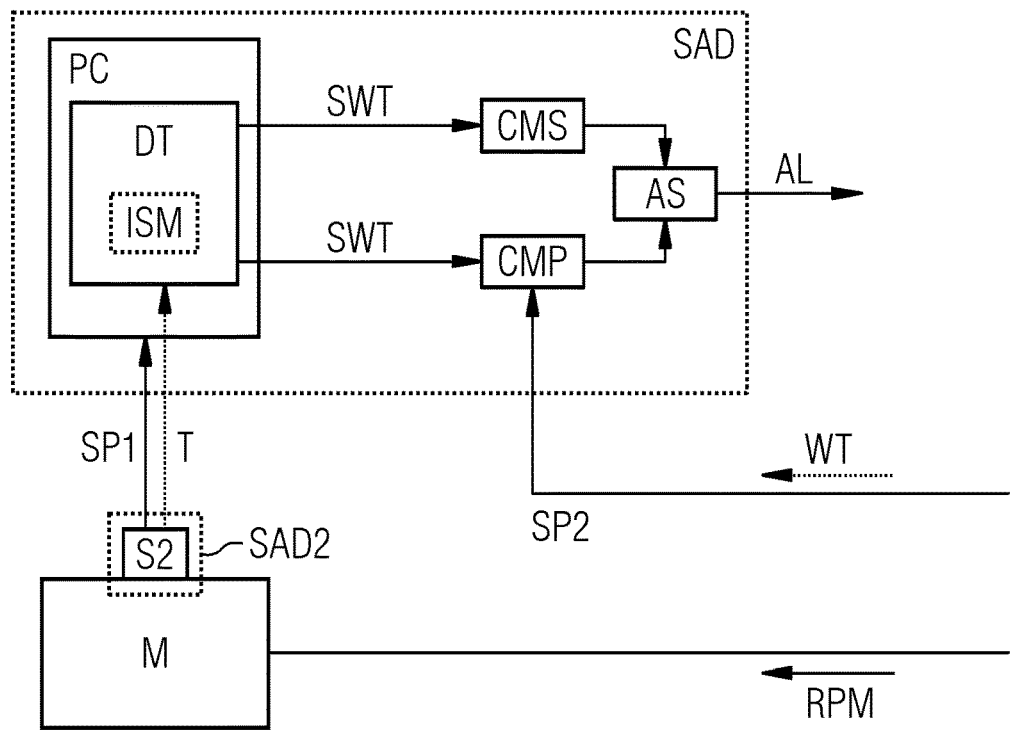
FIG. 4 shows a second specific embodiment of the invention evaluating thermal properties of the machine.

FIGS. 3 and 4 visualize a first specific embodiment and a second specific embodiment of the invention, respectively. The depicted components of these specific embodiments may be generally implemented as described above. In the following, only specifics of the components are discussed. The machine M is implemented as an electric drive.

According to the first specific embodiment, which is visualized in FIG. 3, the digital twin evaluates or simulates vibrations of the electric drive M. For this, the digital twin DT comprises a structural model, e.g., a high-fidelity 3-dimensional finite element model or a reduced-order model of the electric drive M.

The electric drive M is controlled by control data which comprise a target rotational speed RPM of a rotor of the electric drive M. As already mentioned above, the target rotational speed RPM may be compromised by a cyber-attack.

Furthermore, an accelerometer acting as secured sensor S2 is mounted on the electric drive M, on a driving end of a motor of the electric drive M. This location is very sensitive to changes in the operating conditions of the electric drive M. The accelerometer S2 measures vibrations of the electric drive M and transmits resulting vibration data VIB to the digital twin DT via the first secured transmission path SP1 without alteration.

The structural model of the digital twin DT is able to simulate machine vibrations given a certain rotational speed of the rotor of the electric drive M. From this model, an inverse model ISM is obtained which attempts to determine a simulated rotational speed SRPM of the rotor based on the vibration data VIB. The inferred value of the simulated rotational speed SRPM is output by the digital twin DT to the comparator CMP.

The comparator CMP then compares the simulated rotational speed SRPM with the target rotational speed RPM, which was transmitted to the comparator CMP via the second secured transmission path SP2. A deviation between the simulated rotational speed SRPM and the target rotational speed RPM is calculated according to $\Delta RPM = |SRPM - RPM|$.

If the target rotational speed RPM has been manipulated and the monitoring device IOU is showing misleading values, then the deviation $\Delta RPM$ is usually large. Accordingly, the deviation $\Delta RPM$ is compared with a given threshold value and an alarm signal is triggered if the threshold is exceeded.

In an embodiment, the digital twin DT further comprises a signal analysis module which calculates an average velocity V of the electric drive M from the vibration data VIB. The average velocity V may be calculated as a root mean square value of a plurality of individual measurements. In particular, the average velocity V may be obtained by integration of the acceleration data VIB.

The average velocity V is then input to the condition monitoring system CMS to assess a severity of the machine operation, e.g., according to guidelines of an ISO-norm.

FIG. 4 visualizes the second specific embodiment, where the digital twin DT evaluates thermal properties of the electric drive M. For this, the digital twin DT comprises a thermal model, e.g., a heat transfer model. The electric drive M is again controlled by control data which comprise a target rotational speed RPM of a rotor of the electric drive M. The target rotational speed RPM may be compromised by a cyber-attack.

A thermocouple acting as secured sensor S2 is mounted on a bearing shield of the electric drive M. The thermocouple S2 measures a temperature of the bearing shield and transmits resulting temperature data T to the digital twin DT via the first secured transmission path SP1 without alteration.

The thermal model of the digital twin DT is able to simulate a temperature distribution in the electric drive M. In particular, a relationship between temperatures at different subcomponents of the electric drive M can be determined by the thermal model. Hence, the thermal model allows to derive an inverse model ISM which can determine a simulated winding temperature SWT of a motor of the electric drive M given the temperature data T. The simulated winding temperature SWT is output by the digital twin DT to the comparator CMP as well as to the condition monitoring system CMS.

The condition monitoring system CMS can check whether the simulated winding temperature SWT lies within an acceptable operating range, e.g., according to recommendations of an ISO-norm. In case the temperature exceeds a certain threshold, an alarm signal may be triggered.

The comparator CMP further receives a winding temperature WT estimated by an empirical simplified model of the machine controller CTL on the basis of the target rotational speed RPM. The estimated winding temperature WT is also displayed on the monitoring device IOU and may be compromised by a cyber-attack.

The estimated winding temperature WT is transmitted to the comparator CMP via the second secured transmission path SP2 without alteration.

The comparator CMP then compares the simulated winding temperature SWP with the estimated winding temperature WT, and a deviation is calculated analogous to the corresponding calculation described above. If the target rotational speed RPM has been manipulated and the monitoring device IOU is showing misleading values, then the deviation between simulated and estimated winding temperature is usually large. Accordingly, the deviation is compared with a given threshold value and an alarm signal is triggered if the threshold is exceeded.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for detecting a cyber-attack on a machine controller controlling a machine, the method comprising:
   a) running a concurrent simulation of the machine on a computer in a secured access domain;
   b) transmitting, from the machine controller, actual control data to the machine and resulting monitoring data to a monitoring device;
   c) transmitting sensor data of the machine to the concurrent simulation on a first secured transmission path;
   d) simulating, by the concurrent simulation, an operational behavior of the machine based on the sensor data, thus inferring simulated monitoring data;
   e) comparing the simulated monitoring data with the resulting monitoring data; and
   f) triggering an alarm signal depending on the comparing.

2. The method according to claim 1, wherein the concurrent simulation is implemented as a digital twin continuously supplied with sensor data of the machine and continuously simulating its operational behavior.

3. The method according to claim 1, wherein the resulting monitoring data comprise sensor data, actual control data and/or operational data of the machine.

4. The method according to claim 1, wherein the resulting monitoring data are transmitted on a second secured transmission path from the machine controller and/or from the monitoring device to a comparator, which also receives the simulated monitoring data for the comparison with the resulting monitoring data.

5. The method according to claim 1, wherein:
   the resulting monitoring data comprise the actual control data;
   the concurrent simulation evaluates an inverse simulation model of the machine, thus determining simulated control data which are compatible with the sensor data;
   the simulated control data are compared with the actual control data; and
   the alarm signal is triggered depending on the comparing.

6. The method according to claim 1, wherein:
   the sensor data comprise first measured data from a first sensor internal to the machine and second measured data from a second sensor coupled to the machine,
   the second sensor is secured against external influence,
   a physical compatibility of the first measured data with the second measured data is tested by the concurrent simulation, and
   an alarm signal is triggered depending on the test.

7. The method according to claim 6, wherein the first measured data and the second measured data are weighted by different weight factors in the concurrent simulation.

8. The method according to claim 1, wherein:
   the simulated monitoring data are transmitted on a third secured transmission path from the concurrent simulation to a condition monitoring system,
   the condition monitoring system evaluates the simulated monitoring data to detect an anomalous behavior of the machine, and
   an alarm signal is triggered depending on an evaluation.

9. The method according to claim 1, wherein the secured access domain and/or a secured transmission path is secured:
   by an isolation or separation from the internet;
   by protecting against an access or data transfer from the machine controller;
   by authenticating communication endpoints;
   by protecting integrity or confidentiality of communicated data;
   by detecting unauthorized alteration of communicated data;
   by a unidirectional gateway; and/or
   by a data diode.

10. A system for detecting a cyber-attack on a machine controller, the system comprising:
    one or more hardware processors configured to perform a method according to claim 1.

11. A computer program product, comprising a computer readable hardware storage device having computer readable program code stored therein, said program code executable by a processor of a computer system to implement a method for detecting a cyber-attack on a machine controller, according to claim 1.

12. A non-transient computer readable storage medium storing a computer program product according to claim 11.

* * * * *